(12) United States Patent
Norman et al.

(10) Patent No.: US 12,411,114 B2
(45) Date of Patent: Sep. 9, 2025

(54) CHROMATOGRAPHY COLUMN ADAPTOR AND USE FOR FLUIDIC CONNECTIONS

(71) Applicant: Agilent Technologies, Inc., Santa Clara, CA (US)

(72) Inventors: Wesley M Norman, Ludenberg, PA (US); William H Wilson, Newark, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 328 days.

(21) Appl. No.: 18/168,389

(22) Filed: Feb. 13, 2023

(65) Prior Publication Data

US 2024/0125745 A1    Apr. 18, 2024

Related U.S. Application Data

(60) Provisional application No. 63/416,887, filed on Oct. 17, 2022.

(51) Int. Cl.
*G01N 30/60* (2006.01)
*G01N 30/02* (2006.01)

(52) U.S. Cl.
CPC ... *G01N 30/6026* (2013.01); *G01N 2030/025* (2013.01); *G01N 2030/6013* (2013.01)

(58) Field of Classification Search
CPC .............................................. G01N 2030/6013
See application file for complete search history.

(56) References Cited

U.S. PATENT DOCUMENTS

| 4,083,702 A * | 4/1978 | Hartigan ............ G01N 30/6039 96/106 |
| 4,529,230 A * | 7/1985 | Fatula, Jr. ............ G02B 6/3809 285/911 |
| 4,586,733 A | 5/1986 | Anderson, Jr. |
| RE32,482 E | 8/1987 | Anderson |
| 10,851,925 B2 | 12/2020 | Wexler et al. |
| 11,060,648 B2 | 7/2021 | Kwak et al. |
| 2010/0005855 A1 | 1/2010 | Silva et al. |
| 2014/0053639 A1 | 2/2014 | Dellarovere et al. |
| 2021/0048416 A1 | 2/2021 | Moeller et al. |
| 2022/0003724 A1 | 1/2022 | White et al. |

FOREIGN PATENT DOCUMENTS

| CN | 110925504 A | 3/2020 |
| CN | 211059536 U | 7/2020 |
| CN | 214310343 U | 9/2021 |
| CN | 215806935 U | 2/2022 |
| CN | 113446444 B | 10/2022 |
| GB | 437416 A | 10/1935 |

(Continued)

OTHER PUBLICATIONS

Parker Hannifin Corporation, "Dry Technology The Guide to Leak-Free Connections", Dec. 2004, 104 pages.

(Continued)

*Primary Examiner* — Daniel S Larkin (57) ABSTRACT

The present disclosure relates generally to a chromatography column adaptor for forming a fluidic connection between a chromatography column and a GC component. The present disclosure also relates to fluidic connections for a gas chromatography system.

20 Claims, 6 Drawing Sheets

(56) References Cited

FOREIGN PATENT DOCUMENTS

| | | | |
|---|---|---|---|
| JP | 4533830 | B2 | 6/2010 |
| JP | 6221422 | B2 | 10/2017 |
| JP | 6976017 | B1 | 11/2021 |
| WO | 0116517 | A1 | 3/2001 |

OTHER PUBLICATIONS

Spir Star "Product Finder" https://www.spirstar.de/en/product-finder/?menu_id=30, 7 pages.
Adapt All, "Sealing Methods," https://www.adaptall.com/info-tutorials/sealing-methods.php, 4 pages.
SKF, "Connection Nipples", https://www.skf.com/us/products/maintenance-products/hydraulic-tools-for-mounting-and-dismounting/accessories/connection-nipples, 8 pages.
Malone Specialty Inc., "Komatsu Fittings," https://www.malonespecialtyinc.com/product-category/komatsu-fittings/, 3 pages.
Thermo Fisher Scientific, "MilliporeSigma Supelco Tubing Adapter M6 Female, 10-32 Male", https://www.fishersci.com/shop/products/tubing-adapter-m6-female-10-32-male/111012089#?keyword=, 2 pages.
Millipore Sigma "Chromolith 5-4.6 Guard Cartridge Holder", https://www.emdmillipore.com/US/en/product/Chromolith-5-4.6-guard-cartridge-holder,MDA_CHEM-152032, 2 pages.
Thermo Fisher Scientific, "MilliporeSigma Supelco Coupler for Legacy Guard Column Holder, PEEK", https://www.fishersci.com/shop/products/coupler-legacy-guard-column-holder-peek/111004843, 1 Page.
Waters, "Vanguard Column Protection," 8 pages.
PCT, "Notification of Transmittal of The International Search Report and the Written Opinion of The International Searching Authority, or the Declaration mailed on Dec. 8, 2023," Application No. PCT/US2023/030367, 11 pages.
Vici, et al., "About Valco Fittings," [retrieved on Nov. 24, 2023]. Retrieved from the Internet: <URL: https://www.vici.com/ft_intro/fi_val3.php>, Sep. 20, 2020, 2 pages.

* cited by examiner

CHROMATOGRAPHY COLUMN ADAPTOR AND USE FOR FLUIDIC CONNECTIONS

CROSS-REFERENCE TO RELATED APPLICATIONS

This application claims priority to and benefit of U.S. Provisional Patent Application No. 63/416,887, filed on Oct. 17, 2022, the contents of which are incorporated herein by reference in their entirety.

FIELD OF THE INVENTION

The present disclosure relates generally to a chromatography column adaptor for forming a fluidic connection between a column and another component of a gas chromatography system. The present disclosure also relates to fluidic connections for a gas chromatography system.

BACKGROUND OF THE INVENTION

Gas chromatographs (GC) can analyze a gas, liquid, or solid sample by separating the constituents of the sample and producing a signal that indicates the quantity and type of analytes in the sample. A sample is injected into the inlet of the GC, either manually or using a sampling device. The sample, if not already in the gaseous state, is vaporized in the inlet and pushed onto the column by the pressurized carrier gas. Typical carrier gases used in gas chromatography include helium, hydrogen, nitrogen, and a mixture of argon and methane. Typical column flow rates vary from 0.5 ml/min to 20 ml/min, while pressures are typically in the range of vacuum to 150 psi. The column is heated by an oven or other heating device and contains a stationary phase that, along with the temperature of the column, separates the analytes of the sample. Temperatures for laboratory GC instruments generally range from −20° C. to 450° C. The temperature of the column and other components of the GC can also be ramped. Ramp rates of the GC column are typically around 5° C./min, but sometimes go up to 120° C./min. After the separated analytes leave the column, they enter the detector, which produces a signal indicative of the amount and type of analyte in the sample. As a result, GC systems require several fluidic connections between various components.

One of the traditional ways of making fluidic connections is a nut-ferrule connection. This type of connection uses a ferrule and a nut to tightly hold tubes inside a fitting and create a fluid-tight seal between the tube, ferrule, and fitting. Fittings and ferrules have been utilized in this way to form fluidic connections between two tubes or a tube and another component within a variety of flow components. Ferrules are often employed in applications involving small-scale fluid flows, such as analytical instruments and microfluidic devices, and thus may be sized to join small-bore conduits, such as capillary tubes or fluidic fittings. As one example, a ferrule may be utilized to join the end of a capillary-scale chromatographic column to a fitting that is part of or communicates with an analytical detector or the sample inlet of an analytical measurement device. Ferrules are typically composed of a metal, graphite, or a composite, such as graphite-polyimide. The body of a typical ferrule is axisymmetric and defines an internal bore through which the tube to be sealed is inserted. At least a portion of the ferrule, or "nose" portion, is often conical.

Nut-ferrule connections are widely used in gas chromatography instruments. However, using such connections in GC instruments has some disadvantages. One risk from use of a nut-ferrule connection is peak broadening or tailing due to dead volume (unswept or poorly swept volume, such as cavities in the flow path) or excess volume between the tubes or within the fittings. Even a very small dead volume in a flow path can impact the performance of the GC system. Nut-ferrule connections are also prone to over tightening, which may cause column breakage or insufficient tightening, which may cause leakage due to poor sealing. There is also a risk of incorrectly installing the column in the ferrule and fitting, resulting in excess dead volume in the flow path. Additionally, nut-ferrule connections require creating a fluid-tight seal at two interfaces to avoid leaks.

Another way of making connections between tubes in GCs is a glue-adaptor connection, but this also has disadvantages. After gluing a column, the detector and/or the injector are permanently attached to the column or at least require special tools to separate which may result in the damage of some components.

Chromatography columns are available in a wide variety of formats, including many different diameters. Many chromatography columns are capillary columns, which usually have outside diameters (OD) in the range of 0.2 to 0.8 mm; however, some columns, known as packed columns, are filled with coated or uncoated particles to increase the interaction between the sample and the column stationary phase. These have larger ODs compared to capillary columns, which usually range from 1/16 to 1/4 inches and an inner diameter (ID) of approximately 0.75 to 4 mm. Both types of chromatography columns need to have a physical and/or fluidic interface to GC components, such as inlets, detectors, and other flow path components. Due to the significant difference in the OD of capillary and packed columns, there is a risk of dead volume and leaks in the flow path if the same connection and sealing surface is used for creating a fluidic connection between GC components and each type of column. Alternatively, having custom inlets, detectors, and other GC components to interface to each type of column is not cost-effective and does not allow users to switch between different column types without replacing their inlet or detector which can be an invasive procedure.

Existing devices for interfacing the column with detectors or inlets are usually designed to accept a ferrule and nut to fluidically seal to a capillary column, the most commonly installed type of column. For interfacing with a packed column, a fitting and ferrule are usually used. As will be described below, existing fitting and ferrule devices are subject to breakage during installation and create dead volume in the flow path.

There remains a need for a robust connection between GC components and packed columns while minimizing dead volume in the flow path.

SUMMARY OF THE INVENTION

As one aspect of the present invention, a chromatography column adaptor is provided for fluidically coupling a packed column to a GC component. The GC column adaptor comprises a GC component interfacing end and a column receiving end; an adaptor body comprising a wide adaptor bore at the column receiving end, a narrow adaptor bore at the GC component interfacing end, and a tapering adaptor bore connecting the wide and narrow adaptor bores; and an external conical sealing surface at the GC component interfacing end for forming a seal with a GC component.

As another aspect, a gas chromatography column adaptor assembly is provided. The GC column adaptor assembly comprises a GC column comprising a column end, and one of the present adaptors attached to the column end. In some embodiments, the chromatography column adaptor assembly comprises a chromatography column having a chromatography column end; a chromatography column adaptor as described herein; and another GC component comprising a GC component flow path. The chromatography column end is disposed in the wide adaptor bore, and the GC component interfacing end of the chromatography column adaptor is fluidically connected with the GC component flow path.

As yet another aspect, a method for forming a fluidic connection between a chromatography column and a flow interface of a GC component is described. The method comprises attaching a chromatography column adaptor as described herein to a GC component so as to form a fluidic connection between the narrow adaptor bore and a GC component flow path. The method also comprises passing an end of the chromatography column through a ferrule and a nut. The adaptor comprises threads on an outside adaptor wall, and the nut comprises threads reciprocal to the threads on the adaptor. The ferrule and the column are inserted into the wide adaptor bore of the adaptor. The column is attached to the adaptor by mating the threads of the nut with the threads of the adaptor and tightening the nut on the adaptor. In some embodiments, the adaptor body comprises an engagement feature, and the method comprises using the engagement features to turn the adaptor relative to the GC component to form a seal. In some embodiments, the method comprises preventing rotation of the adaptor while tightening the nut on the adaptor in order to avoid further tightening of the connection between the adaptor and GC component.

These and other features and advantages of the present devices and methods will be apparent from the following detailed description, in conjunction with the appended claims.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

The present adaptors provide several advantages over existing techniques for making a fluidic connection between a chromatography column, especially a packed column having a relatively large outer diameter, and another component of a GC system, especially a component having a relatively small inner diameter. As an example, the present adaptors can provide robust fluidic connections with minimal dead volume in a flow path. The present adaptors can also allow a user to tighten the fluidic connection in a controlled manner and are resistant to damage from use or misuse, such as overtightening.

Gas Chromatography Systems

Figure 1:
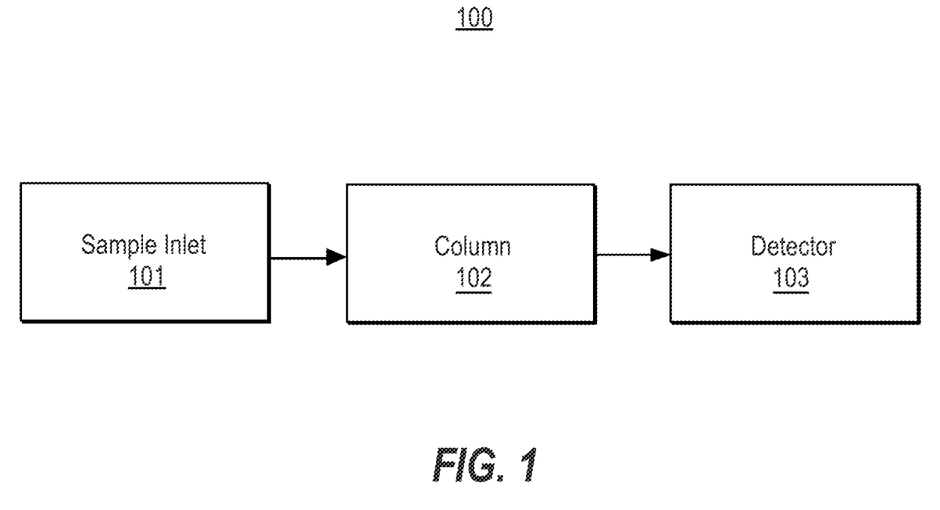
FIG. 1 is a simplified block diagram of a GC system in accordance with a representative embodiment.

FIG. 1 is a simplified block diagram of a GC system 100 in accordance with a representative embodiment. Many aspects of the GC system 100 are known to one of ordinary skill in the art. As such, details of certain known components of the GC system 100 are omitted. In certain instances, representative examples of known components that may be implemented are noted, but are presented for illustration and are, in no way, intended to be limiting.

The GC system comprises a sample inlet 101, where the sample is introduced into the GC flow path. The sample inlet is fluidically coupled to the inlet of a column 102, which may be one of a variety of columns useful in gas chromatography.

The column 102 separates the components of a chemical sample. The column 102 may be a capillary column comprising tubing (not shown), which is often fused silica tubing with a coating on the inner portions of the tubing that interacts with the sample from sample inlet 101 to separate the components of the chemical sample. The dimensions of this column 102 vary, but typical inside diameters range from 100 μm to 530 μm. Typical lengths range from 5 meters to 60 meters. The column may also be a packed column, often formed from glass or metal, and with a typical outside diameter between 1/16 and 1/4 inches (about 1.59 and 6.35 mm) and filled with stationary phase.

The outlet of the column 102 is connected to a detector 103, which detects the presence and frequently the quantity of the components separated by the column 102. Generally, the detector 103 is a GC detector, such as a flame ionization detector (FID), a mass spectrometer detector (MSD), a thermal conductivity detector (TCD), an electron capture detector (ECD), a nitrogen phosphorus detector (NPD), a sulfur chemiluminescence detector (SCD), a nitrogen chemiluminescence detector (NCD), a pulsed flame photometric detector (PFPD), or a helium ionization detector (HID). In accordance with a representative embodiment, the detector may be a flame photometric detector (FPD).

The column may also be connected to other components within the GC system, such as flow devices used for backflushing, switching, splitting, or chemical modification of the fluid in the flow path.

Chromatography Adaptors

Gas chromatography (GC) inlets and detectors in a GC system need to interface to the GC column by forming a physical and fluidic connection. The columns may be capillary columns (0.2-0.8 mm OD) or packed columns (1/16 inch to 1/4 inch OD) or other types. Users of a given GC system may need to use different types of columns at different times. Given the significant difference between the outer diameters of capillary columns and packed columns, the inlets and detectors need to have a different interface to accommodate the two different types of columns to create a leak-free seal and reduce dead volume in the flow path. Instead of creating two different inlets or detectors, the inlets and detectors are typically designed to accept a capillary column (the most commonly used type of column), and some type of fitting is used when a user wants to instead attach a packed column.

Figure 2A:
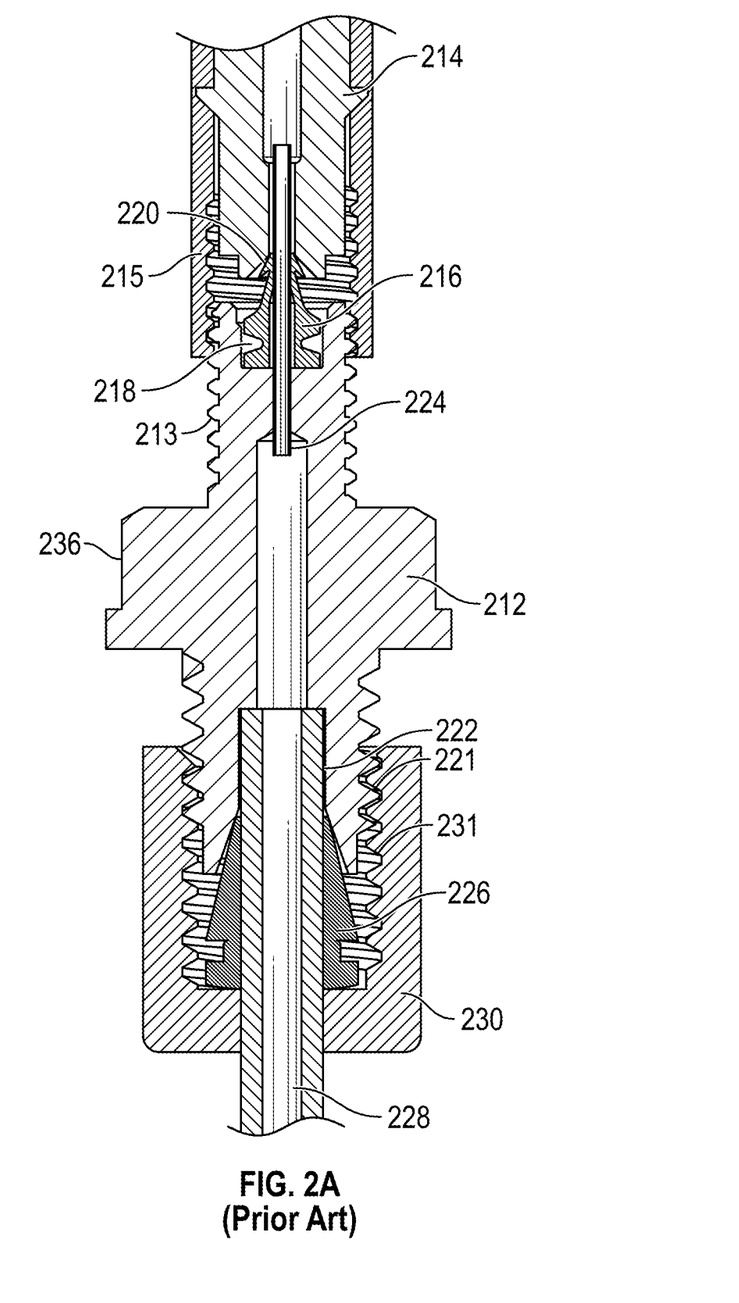
FIGS. 2A and 2B illustrate a conventional fitting assembly for fluidically connecting a chromatography column to a GC component.

An example of an existing fitting 212 for connecting a packed column to an inlet or detector is shown in FIG. 2A. The fitting 212 is positioned in a GC component 214, which may be a GC detector or GC inlet or other component. The fitting 212 has a recess 218 at the fitting end that interfaces with the GC component 214 so that a separate ferrule 216 can be held by the fitting 212. A small bore or capillary tube 224 is connected to the fitting 212 which forms a flow path between the fitting 212 and the GC component 214 to which it is connecting. By applying a force between GC component 214 and fitting 212 (by tightening mating threads on each, i.e., GC component threads 215 and fitting threads 213), a leak-free seal is created between the external conical sealing surface of ferrule 216 and internal conical sealing surface 220 of GC component 214 as well as between the internal bore of ferrule 216 and the outer surface of connected tube 224.

On the other end of fitting 212 is a recess 222 sized to accept a packed column. A separate ferrule 226 is used to create a fluidic connection between column 228 and fitting 212 by creating a seal between the external conical sealing surface of ferrule 226 and the internal conical sealing surface of fitting 212 and between the internal bore of ferrule 226 and the outer surface of column 228. Mating threads on fitting 212 and nut 230 (i.e., fitting threads 221 and nut threads 231) serve to apply the force necessary to create these seals. Flats 236 are provided on fitting 212 for tightening the connection between fitting 212 and GC component 214 as well as supporting fitting 212 while tightening nut 230.

Figure 2B:
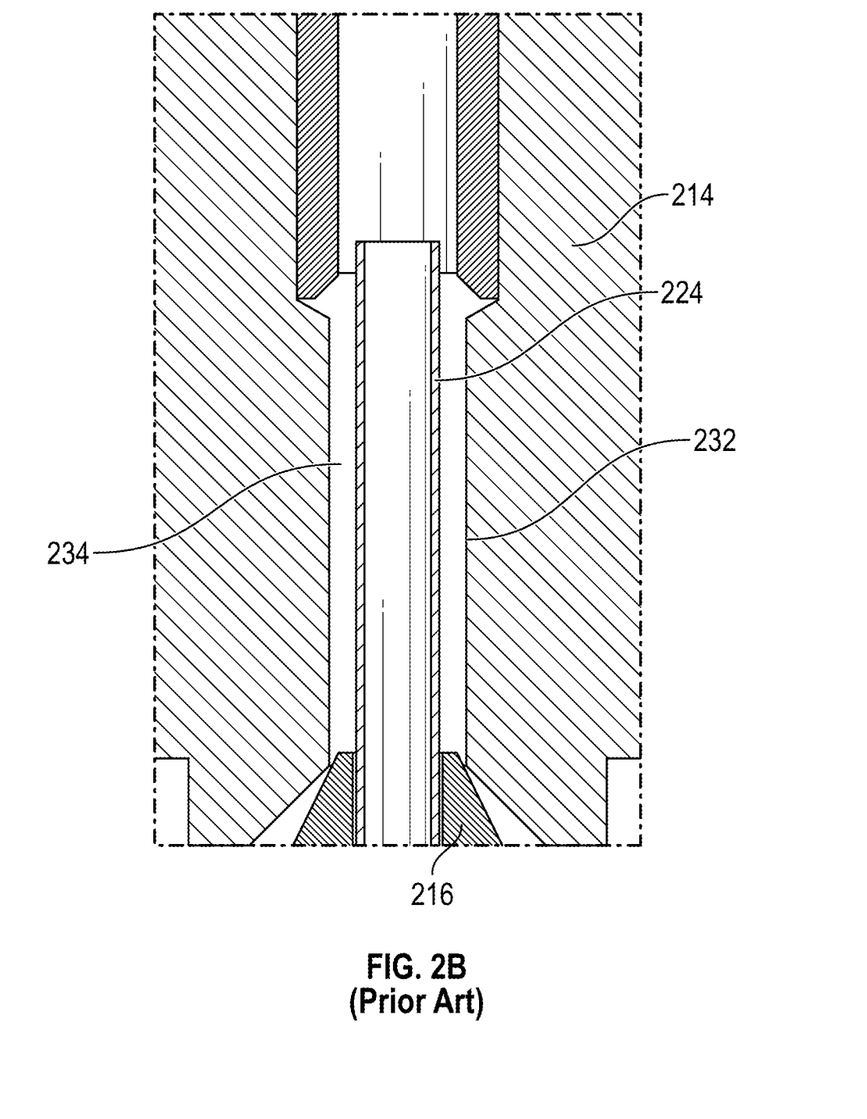

While this provides a relatively good fluidic connection, it still has disadvantages. For instance, as shown in FIG. 2B, there is a gap between the connected tube 224 and the inner diameter of a mating flow path 232 in the GC component 214, which provides unswept or dead volume 234 for a fluid to get trapped or delayed. This is likely to cause issues with the chromatography analysis and results. In addition, the stress applied to the connected tube 224 and the ferrule 216 can cause the connection to break inside of the GC component if fitting 212 is overtightened.

The present column adaptor avoids several disadvantages of existing fittings and ferrules. It eliminates the connected tube 224 and the separate ferrule for the connection to the GC component, effectively integrating the functionality of the ferrule into the adaptor. This integral adaptor design also reduces the complexity of the assembly and increases ease-of-use. By integrating the ferrule for the attachment and sealing of the adaptor to a GC component, it is possible to eliminate the connected tube 224, thus avoiding or reducing the unswept volume between the outer diameter of the tube and the inner diameter of the GC component and reducing the likelihood of breakage. In contrast, the connected tube 224, or at least the portion of the tube that extends past the end of the ferrule, creates dead volume, and cannot be avoided when a separable ferrule is used. Additionally, the tube cannot be shortened too much and needs to extend a distance past the end of the ferrule nose, otherwise the seal between the ferrule and column will be compromised. The tube cannot be eliminated from existing fittings without a way to create a gas-tight seal between the back flat face of the ferrule and the recess of the fitting. This is difficult for metal ferrules, and graphite vespel ferrules would cause inertness issues since the inner diameter of such a ferrule would be in the flow path with no tube. The present adaptor design also eliminates the additional sealing surface that existed between the ferrule and the tube, which reduces the sources of potential leaks.

Figure 3:
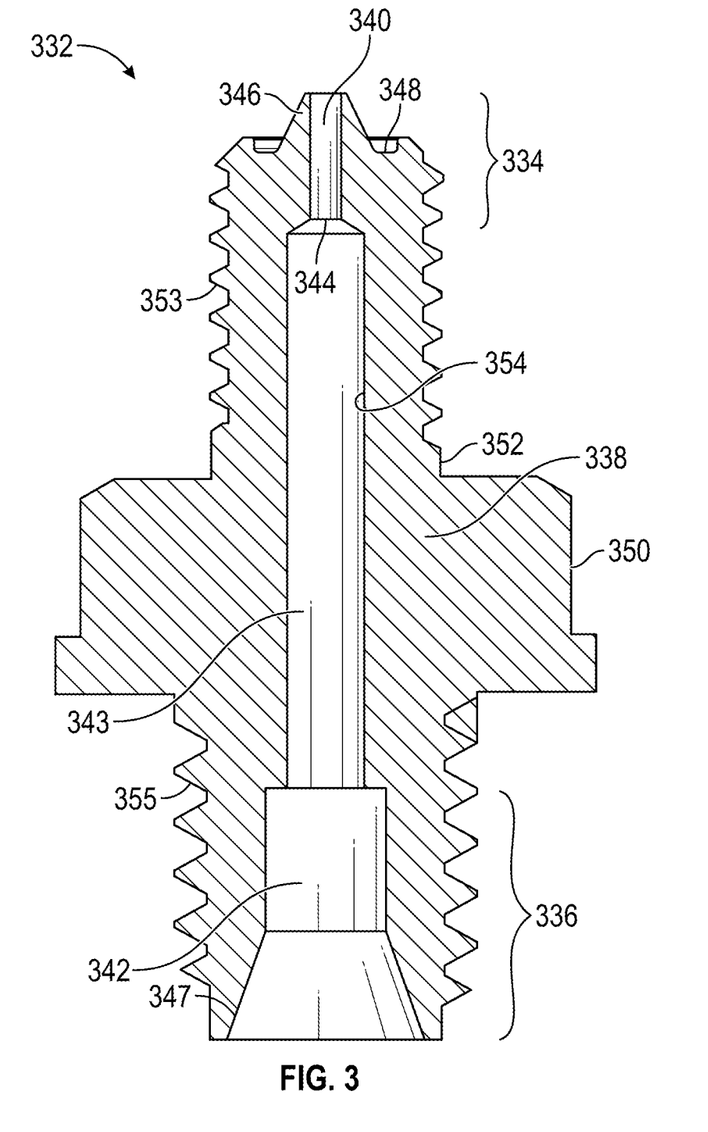
FIG. 3 illustrates an embodiment of the present chromatography column adaptor.

An example of the present chromatography column adaptor for fluidically coupling a column to a GC component is shown in FIG. 3. FIG. 3 shows a cross-section of the chromatography column adaptor 332, which comprises a GC component interfacing end 334 and a column receiving end 336. The adaptor also comprises an adaptor body 338 comprising a wide adaptor bore 342 at the column receiving end 336, a narrow adaptor bore 340 at the GC component interfacing end 334, and a tapering adaptor bore 344 connecting the wide and narrow adaptor bores. The narrow adaptor bore 342 may be sized to be substantially similar to or essentially the same as the diameter of the flow path in the GC component to which the adaptor is intended to attach (for example, from about 0.5 mm to about 1.3 mm, or about 0.8 mm). The narrow adaptor bore 342 forms at least part of the flow path to the GC component, wherein the sample flowing through the adaptor contacts the inside adaptor wall of the narrow adaptor bore, as opposed to contacting a tube inserted through the narrow adaptor bore.

The wide adaptor bore may be sized to be substantially similar to the OD of the column to which it is intended to receive to avoid gaps or corners where sample can become trapped (for example, 1/16 inch to 1/4 inch). There may also optionally be an intermediary bore connecting the wide and narrow adaptor bores. The intermediary bore may be of a diameter larger than the narrow adaptor bore, but smaller than the wide adaptor bore. It may be of a substantially similar or essentially same diameter as the inner diameter of the column being attached to the adaptor to facilitate the flow between the adaptor and attached column (for example, 0.75 mm to 2 mm). The intermediary bore forms part of the flow path wherein the sample contacts the walls of the intermediary bore. The wide adaptor bore houses the column, but the wide adaptor bore generally does not form a part of the flowpath, meaning that the sample does not contact the walls of the wide adaptor bore since it instead flows through the attached column. If there is no intermediary bore, the tapering adaptor bore spans the transition between the narrow adaptor bore and the wide adaptor bore; however, if there is an intermediary adaptor bore, the tapering adaptor bore spans the transition between the narrow adaptor bore and the intermediary adaptor bore.

The adaptor also comprises an external conical sealing surface 346 at the GC component interfacing end 334 for forming a seal with a GC component. At the end of the protrusion, fluid exits the adaptor through the narrow adaptor bore. The narrow adaptor bore 340 serves as a flow path for the sample and/or carrier gas flowing through the GC system, as opposed to having a separate tube inserted into the bore to serve as the flow path. The GC component interfacing end 334 and the GC component flow path interface so that a fluid passing from the narrow adaptor bore to the GC component flow path does not accumulate in an unswept area. The chromatography column adaptor is configured to make a fluidic connection with a GC component without using a separate ferrule to seal to the GC component and without a separate tube within the narrow adaptor bore. In some embodiments, the adaptor body 338 is described as having an outside adaptor wall 352 and an inside adaptor wall 354. The adaptor 332 generally comprises adaptor ends with an outside adaptor wall 352 extending between the adaptor ends. The inside adaptor wall 354 surrounds a central axis of the adaptor 332 and defines the wide adaptor bore 342, the tapering adaptor bore 344, the intermediary adaptor bore 343, and the narrow adaptor bore 340. The inside adaptor wall 354 can form the flow path for the sample and/or carrier gas flowing through the GC system and/or accommodate one or more tubes that form the flow path, as will usually be the case for the wide adaptor bore 342 which hold a column. In some embodiments, the adaptor 332 further comprises a recess 348 for receiving a protrusion or edge in the connected GC component.

In some embodiments, the outside adaptor wall 352 may have interlocking features, such as threads, to enable connection with a GC component or other connecting devices, such as nuts, used to attach a GC column and apply a force used for sealing the adaptor to the GC component and the chromatography column. For example, first threaded area 353 may be disposed on the outside adaptor wall 352 on the GC component interfacing end 334 for mating with corresponding threads on a GC component, and a second threaded area 355 may be disposed on the outside adaptor wall 352 on the column receiving end 336 for interfacing with an element used to connect a GC column. First threaded area 353 and second threaded area 355 may form a single threaded area if extended along the length of the adaptor body.

In some embodiments, the adaptor 332 comprises an engagement feature 350 to facilitate engagement of the adaptor 332 by a tool, a fastener, or other object. For example, the engagement feature 350 can be configured so a tool can more readily engage the adaptor 332 when the adaptor 332 is being positioned or adjusted with respect to another structure. The engagement feature 350 can comprise a widened portion of the adaptor body 338 (as shown in FIG. 3), or a narrowed portion or a flattened portion, and it may comprise the same material as the adaptor body 338 or a different material, such as a coating. The engagement feature 350 can be smooth or roughened, and/or comprise threads, notches, posts, or other features. As one example, the engagement feature may be flats for mating with a wrench while connecting the adaptor to a GC component or a chromatography column.

In various embodiments of the present adaptors, the adaptor body 338 and/or the outside adaptor wall 352 and/or the inside adaptor wall 354 can be circular, rectangular, square or any desired shape in cross-section. In some embodiments, the adaptor body is substantially cylindrical. In some embodiments, the adaptor body has a length of from about 20 mm to about 80 mm. In some embodiments, the narrow adaptor bore has a diameter between about 0.5 mm and about 1.3 mm, or about 0.8 mm. In some embodiments, the intermediary adaptor bore and/or an intermediary portion of the adaptor body has a length of about 10 mm or about 12 mm or more, such as from about 10 mm to about 40 mm, though it can be longer in some circumstances.

In some embodiments, the external conical sealing surface has a protrusion end surrounding the narrow adaptor bore and a protrusion sidewall extending between the protrusion end and the remainder of the adaptor body. In some embodiments, the protrusion end has a radius of between about 0.9 mm and about 1.5 mm and/or can be substantially flat. The protrusion sidewall can be at an angle of from about 40° to about 60° with respect to the protrusion end.

Fluidic Connections with GC Components

The present chromatography column adaptors can be used to create fluidic connections between a column and many types of GC components, such as microfluidic devices, inlets, detectors, and other fluidic components of a GC system, such as auxiliary gas input devices. For example, a fluidic connection can be formed where an adaptor according to the present disclosure is attached in a fluid-tight connection with a flow path of a GC component, e.g., mating GC inlet or detector. In some embodiments, the external conical sealing surface 346 of the GC component interfacing end 334 of the adaptor is compressed against one or more parts of the GC component, such as an internal conical sealing surface. That is, the outside adaptor wall 352 can have threads at the GC component interfacing end 334 for engaging with threads on the GC component, so that a compressive force is applied to the external conical sealing surface. The other end of the adaptor can form a fluidic connection with a GC column by compressing an internal conical sealing surface 347 of the column interfacing end 336 of the adaptor 332 against a ferrule used to also seal to the GC column. That is, an outer adaptor wall can have threads, and a nut having mating threads can engage and apply a compressive force to the ferrule.

Figure 4A:
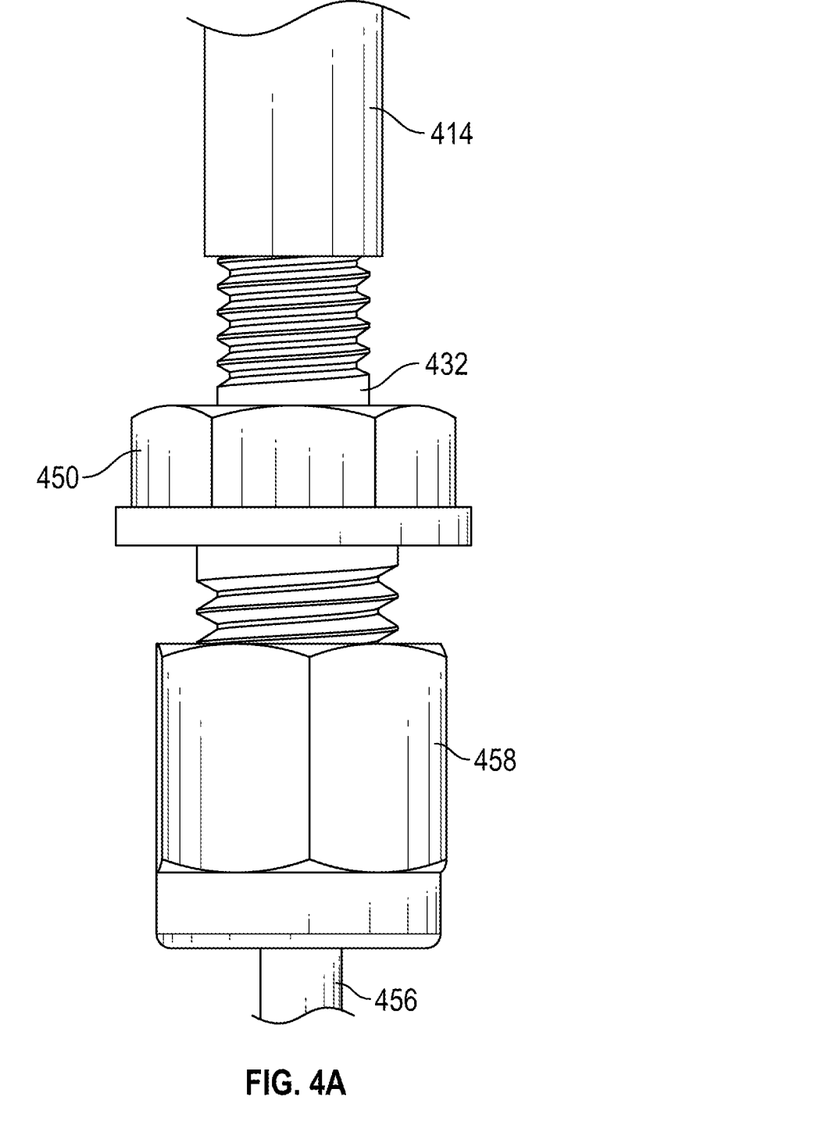
FIGS. 4A and 4B illustrate an embodiment of the present adaptor installed on a GC component with a packed chromatography column attached to it.
Figure 4B:
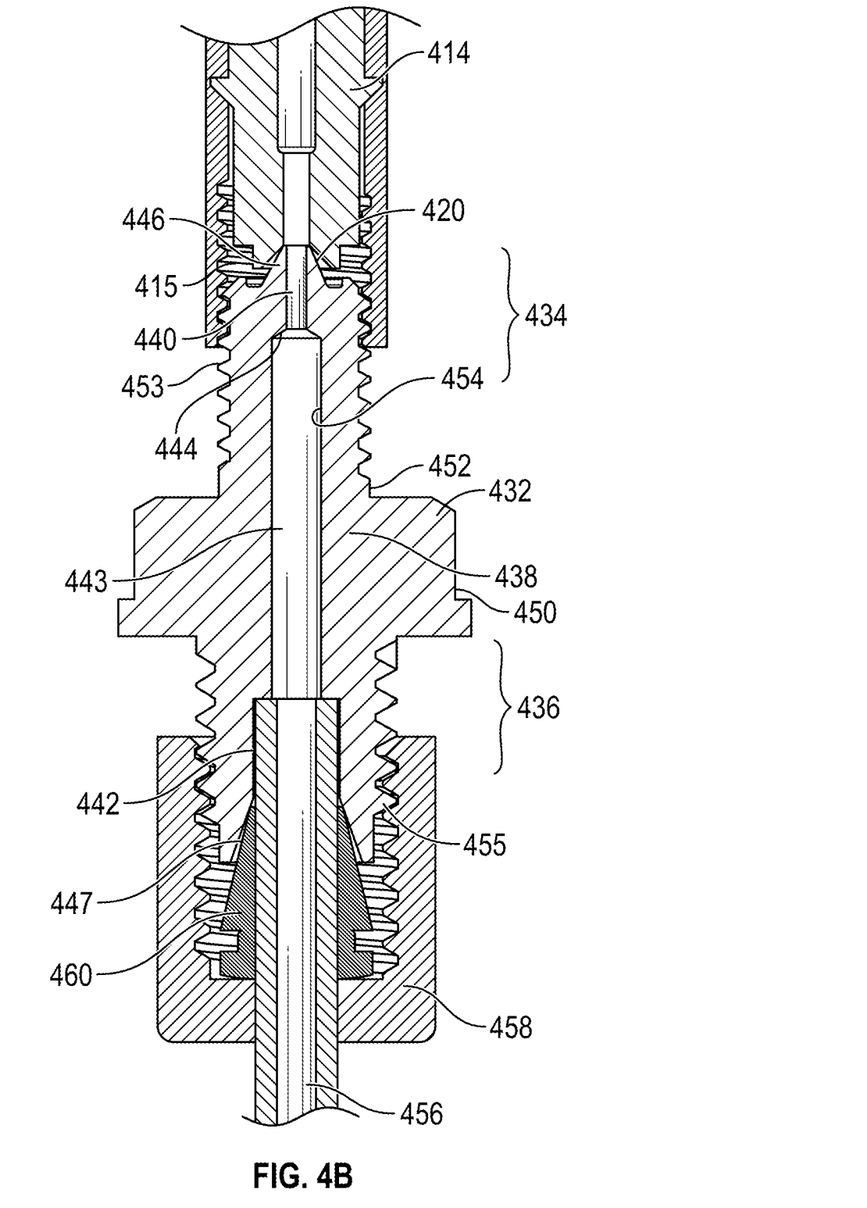

FIGS. 4A and 4B illustrate an embodiment of the present adaptor installed on a GC component with a packed chromatography column attached to the adaptor. The chromatography column adaptor 432 fluidically couples the column 456 to a GC component 414, which may be a GC inlet or a GC detector or other component having a flow path. More particularly, the adaptor 432 comprises a GC component interfacing end 434 and a column receiving end 436. The adaptor 432 also comprises an adaptor body 438 comprising a wide adaptor bore 442 at the column receiving end 436, a narrow adaptor bore 440 at the GC component interfacing end 434, an intermediary adaptor bore 443, and a tapering adaptor bore 444 which connects the narrow adaptor bore 440 and the intermediary adaptor bore 443. Narrow adaptor bore 440, tapering adaptor bore 444, and inside adaptor wall 454 may be considered transitions, to go from the column receiving end 436 into the external conical sealing surface 446 at the GC component interfacing end 443 and further to the GC component 414. The lengths and arrangements in the chromatography column adaptor 432 are an example of such transitions for a ⅛ inch GC column, and for larger columns, additional transitions may be included for better fluidics. As illustrated in FIG. 4B, the wide and narrow adaptor bores 442, 440 are connected by both the intermediary adaptor bore 443 and the tapering adaptor bore 444, but it is also contemplated that wide and narrow adaptor bores can be connected only by an intermediary adaptor bore, or only by a tapering adaptor bore. In some embodiments, the present adaptors comprise more than one intermediary adaptor bore (including intermediary adaptor bores having the same or different diameters) and/or more than one tapering adaptor bore (such as a first tapering adaptor bore between a narrow adaptor bore and a first intermediary adaptor bore, and a second tapering adaptor bore between the first intermediary adaptor bore and a second intermediary adaptor bore).

The adaptor 432 in FIG. 4B also comprises an external conical sealing surface 446 at the GC component interfacing end 434 for forming a seal with an internal conical sealing surface 420 of a GC component 414. The external conical sealing surface 446 of chromatography column adaptor 432 is configured to make a fluidic connection with an internal conical sealing surface 420 in the GC component 414, without using a separate ferrule and without a separate tube within the narrow adaptor bore 440. The external conical sealing surface 446 of chromatography column adaptor 432 is also configured to make a direct sealing interface with the internal conical sealing surface 420, i.e., there is no additional piece in between the two surfaces to create a seal. The adaptor body 438 can also be described as having an outside adaptor wall 452 and an inside adaptor wall 454. The adaptor 432 comprises an engagement feature 450 to facilitate engagement of the adaptor 432 by a tool, a fastener, or other object.

To make a fluidic connection with between the GC component 414 and a chromatography column 456, the GC component interfacing end 434 of the adaptor 432 is inserted into the GC component 414. Interlocking features on the adaptor 432, such as threads 453, can interface with interlocking features on the GC component 414, such as GC component threads 415. The interlocking features can facilitate the application of a force between GC component 414 and adaptor 432 to create a seal between external conical sealing surface 446 and internal conical sealing surface 420. This could be accomplished, for example, by using a tool with engagement feature 450 to rotate or stabilize adaptor 432.

The chromatography column 456 is inserted into the column receiving end 436 of the adaptor 432. The other end of the adaptor 432 can form a fluidic connection with a chromatography column 456 by compressing an internal conical sealing surface 447 of the column interfacing end 436 of the adaptor 432 against a ferrule 460. Generally, a connector can be configured to hold the column 456 in the adaptor and apply a pressure to form a seal and fluidic connection between the chromatography column 456 and the adaptor 432. In the embodiment shown in FIGS. 4A and 4B, a fitting nut 458 has threads that mate with threaded area 455 of adaptor 432, and nut 458 and a ferrule 460 are used to attach the chromatography column 456 to the adaptor 432 by creating a seal between the external conical sealing surface of ferrule 460 and the internal conical sealing surface 447 of adaptor 432 and between the internal bore of ferrule 460 and the outer surface of column 456.

In the adaptors described herein, outside adaptor walls can be configured for interconnecting to other devices, such as a nut or other connector, such as by having interlocking features or threads. Interlocking features include features that engage with each other by overlapping or cooperation of projections and recesses. The adaptor can be configured to securely attach to a GC component 414, so that the adaptor can only be removed by deliberate effort. Alternatively, the outer adaptor walls do not have interlocking features, and the adaptor is configured to be attached in another way. For example, the connection may comprise a clamping mechanism that holds the adaptor and transfers the pressure to the adaptor to form a seal with the GC component.

The present adaptor may be constructed of any material that is capable of forming a seal with the GC component. Preferably, the material does not react with any analytes, reagents, carrier gases, or other components employed in a GC system and can withstand the high temperatures of a GC oven. In some embodiments, the adaptors are metal, such as stainless steel or brass, or another material with the hardness to support a seal without causing damage to the adaptor. The present adaptor may be constructed from a single material or from multiple materials. For example, the adaptor body may be constructed of one material, and a coating of another material may be applied to form the outer adaptor wall and/or the inner adaptor wall and/or the external conical sealing surface. A coating on the inner adaptor wall may serve to reduce interactions of analytes with the surface of the adaptor. A coating on the external conical sealing surface (such as gold) may serve to facilitate creating a seal with the GC component. The present adaptor may be manufactured according to any suitable technique for the materials. For example, the present adaptor may be manufactured by injection molding, compression molding, or machining.

The present column adaptor can be designed and used with any desired chromatography column and is especially advantageous for packed columns. In some embodiments, the chromatography column adaptor has a column receiving end configured to receive a chromatography column having an outer diameter of a selected size or within a selected range. For example, the column receiving end can be configured to receive a column having an outer diameter of about 1/16 inch (about 1.59 mm), or about 1/8 inch (about 3.2 mm), or about 1/4 inch (about 6.4 mm), or about 3/8 inch (about 9.5 mm), or about 0.5 inch (about 12.7 mm) or larger. The column receiving end can be configured to receive such columns by having a wide adaptor bore that has approximately the same diameter as the outside diameter of the column, or a diameter that is no more than 2% larger, alternatively no more than 1% larger, no more than 0.5% larger, or sufficient to have a slip fit between the column tubing and the fitting body sized for a nominal machining tolerance, such as from about 0.12 mm to about 0.45 mm. In some embodiments, the chromatography column is a packed column, which refers to a chromatography column having a relatively large inner diameter and which is packed with particulate material.

The present adaptors can also be used with GC components configured for interfacing with capillary columns, which are longer, open tubular columns whose inside walls are coated with a stationary phase. Typically, the inner diameter of a capillary column is from 0.05 mm to 0.55 mm, while the capillary column's outer diameters are generally from 0.25 mm to 0.8 mm.

The present adaptor eliminates the need for a separate ferrule for the connection between the adaptor and the GC component. In contrast to a conventional nut-ferrule connection, the present adaptor avoids their disadvantages, such as gas leakage and an unswept region. This is due in part to the present column adaptor eliminating a tube within a ferrule.

In some embodiments, the present adaptor is attached to the GC component via an integral engagement feature, such as threads on its outside adaptor wall that engage mating threads on an inside wall of the GC component. The adaptor can be tightened using a wrench or other tool, or by hand in some embodiments, depending on the materials. Alternatively, the adaptor could be press-fit into the GC component, eliminating the need for threads. For press-fitting, the outer diameter on part of the adaptor would be sized appropriately in relation to the inner diameter of the GC component to facilitate a press-fit. In some embodiments, a nut or other fastener is advantageous to avoid loosening of the adaptor during thermal cycling or other conditions and allow for disconnecting the adaptor to change the column. The wide adaptor bore is sized to accommodate the end of the column.

Defined Terms

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

As used herein, the term "ferrule" generally encompasses a fluidic connector that has a conical nose and forms a seal with the outer circumference of a tube and a conical surface of a fitting. In some cases, the ferrule may be similar to that described in Norman et al. US Pat. App. Pub. 20160377203, or another available stainless steel or graphite-Vespel (polyimide) ferrule and may be coated in a conformal material, such as gold or silver.

For the present adaptors, the fluidic connection is typically fluid-tight within a specified range of intended operating pressures. In some applications, the adaptor bore(s) and the tubes to which it may be connected have diameters on the millimeter- or micrometer-scale, in which case the adaptor may be considered as being a microfluidic connector.

The term "flow path" generally refers to any structure configured to provide for fluid flow. The flow path may be a tube or a channel formed in a substrate. A flow path may be formed by or comprise one or more tubes or channels in fluid communication. The geometry of a flow path may vary widely and includes circular, rectangular, square, D-shaped, trapezoidal or other polygonal cross-sections. A flow path may comprise varying geometries (e.g., rectangular at one section and trapezoidal at another section). In some embodiments, the cross-sectional area of a flow path used is substantially constant, e.g., in order to avoid or reduce dead volume or even extra swept volume.

As used herein, the term "external" generally refers to outside of, on an exterior of, or away from the center of a body or component. As used herein, the term "internal" generally means inside of, on an interior of, or closer to the center of a body or component. The meanings of external and internal, as used herein, will generally be apparent from or informed by their contexts.

As used herein, the term "conical" generally refers to a structure shaped as or resembling a cone, including but not limited to a truncated cone. A conical structure has a surface angled between 0 and 90 degrees, more commonly between 15 and 75 degrees, relative to a longitudinal axis of the structure.

In the present disclosure, the terms "substantial" or "substantially" mean to within acceptable limits or degree to one having ordinary skill in the art. The terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. When a ranges of values is set forth in the present disclosure, it should be understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the present disclosure. The upper and lower limits of these smaller ranges may independently be included or excluded in the range, and each range where either, neither, or both limits are included in the smaller ranges is also encompassed within the present disclosure, subject to any specifically excluded limit in the stated range. Where the stated range includes one or both of the limits, ranges excluding either or both of those included limits are also included in the present disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described. All patents and publications referred to herein are expressly incorporated by reference.

As used in the specification and appended claims, the terms "a," "an," and "the" include both singular and plural referents, unless the context clearly dictates otherwise. Thus, for example, "a component" includes one component and plural components. The terms "first" and "second" are terms to distinguish different elements, not terms supplying a numerical limit, and a device having first and second element can also include a third, a fourth, a fifth, and so on, unless otherwise indicated.

In view of this disclosure, it is noted that the present methods can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

Exemplary Embodiments

Exemplary embodiments provided in accordance with the presently disclosed subject matter include, but are not limited to, the following:

Embodiment 1. A chromatography column adaptor for fluidically coupling a column to a GC component, the adaptor comprising: a GC component interfacing end and a column receiving end; an adaptor body comprising a wide adaptor bore at the column receiving end, a narrow adaptor bore at the GC component interfacing end, an external conical sealing surface at the GC component interfacing end; and an internal conical sealing surface at the column receiving end of the wide adaptor bore; wherein the narrow adaptor bore forms at least a portion of a flow path through the adaptor to the GC component.

Embodiment 2. The chromatography column adaptor of embodiment 1, wherein the adaptor does not comprise a separate tube within the narrow adaptor bore.

Embodiment 3. The chromatography column adaptor of embodiment 1 or embodiment 2, wherein the column-receiving end is configured to receive a column having an outer diameter from about 1/16 inch to about 3/8 inch.

Embodiment 4. The chromatography column adaptor of any of embodiments 1 to 3, wherein the adaptor body comprises a tapering adaptor bore connecting the wide and narrow adaptor bores.

Embodiment 5. The adaptor of any of embodiments 1 to 4, wherein the adaptor body further comprises an intermediary adaptor bore between the narrow adaptor bore and the wide adaptor bore.

Embodiment 6. The chromatography column adaptor of any of embodiments 1 to 5, wherein the adaptor body comprises an outside adaptor wall and an inside adaptor wall, wherein the inside adaptor wall defines the wide adaptor bore and the narrow adaptor bore.

Embodiment 7. The chromatography column adaptor of embodiment 6, wherein the outside adaptor wall has threads at the GC component interfacing end for engaging with threads on the GC component to apply a compressive force to the external conical sealing surface.

Embodiment 8. The chromatography column adaptor of embodiment 6, wherein the outside adaptor wall has threads at the column receiving end.

Embodiment 9. The chromatography column adaptor of embodiment 6, further comprising a coating on the inside adaptor wall, wherein the coating is adapted for reducing interactions with analytes.

Embodiment 10. The chromatography column adaptor of any of embodiments 1 to 9, further comprising a coating on the external conical sealing surface, wherein the coating is adapted for facilitating creation of a seal.

Embodiment 11. The chromatography column adaptor of any of embodiments 1 to 10, wherein the external conical sealing surface has a protrusion end surrounding the narrow adaptor bore and a protrusion sidewall extending between the protrusion end and a remainder of the adaptor body.

Embodiment 12. The chromatography column adaptor of any of embodiments 1 to 11, wherein the protrusion sidewall is at a 40 to 60 degree angle with respect to the protrusion end.

Embodiment 13. The chromatography column adaptor of any of embodiments 1 to 12, wherein the adaptor body further comprises an engagement feature.

Embodiment 14. The chromatography column adaptor of any of embodiments 1 to 13, wherein the adaptor is formed from stainless steel or brass.

Embodiment 15. A chromatography column adaptor assembly comprising: a chromatography column having a chromatography column end; and a chromatography column adaptor according to any of embodiments 1 to 14; and a GC component comprising a GC component flow path; wherein the chromatography column end is disposed in the wide adaptor bore, and the GC component interfacing end of the chromatography column adaptor is fluidically connected with the GC component flow path.

Embodiment 16. The chromatography column assembly of embodiment 15, wherein the chromatography column is a packed column.

Embodiment 17. The chromatography column assembly of embodiment 15 or 16, wherein the fluidic connection is made without a separate tube within the narrow adaptor bore.

Embodiment 18. The chromatography column assembly of any of embodiments 15 to 17, wherein the GC component comprises a GC inlet, a GC detector, or a chromatography fluidic device for backflushing, switching, or splitting fluid flow.

Embodiment 19. The chromatography column assembly of any of embodiments 15 to 18, wherein the GC component flow path and the narrow adaptor bore have substantially the same cross-sectional area.

Embodiment 20. The chromatography column assembly of any of embodiments 15 to 19, wherein the wide adaptor bore is substantially the same diameter as the outer diameter of the chromatography column.

Embodiment 21. The chromatography column assembly of any of embodiments 15 to 20, wherein the GC component has an internal conical sealing surface, and the external conical sealing surface of the chromatography column adaptor seals with the internal conical sealing surface of the GC component.

Embodiment 22. The chromatography column assembly of embodiment 21, wherein the GC component interfacing end and the GC component flow path interface so that a fluid passing from the narrow adaptor bore to the GC component flow path does not accumulate in an unswept area.

Embodiment 23. The chromatography column assembly of any of embodiments 15 to 22, wherein the adaptor body further comprises an intermediary adaptor bore between the narrow adaptor bore and the wide adaptor bore.

Embodiment 24. The chromatography column assembly of embodiment 23, wherein the diameter of the intermediary adaptor bore is substantially the same size as the inner diameter of the column.

Embodiment 25. The chromatography column assembly of any of embodiments 15 to 24, further comprising a ferrule inserted in the internal conical sealing surface of the chromatography column adaptor, and the ferrule forms a seal with an outside surface of the chromatography column and an internal conical sealing surface in the chromatography column adaptor.

Embodiment 26. The chromatography column assembly of any of embodiments 15 to 25, wherein an outer adaptor wall comprises threads, and a nut having mating threads engages and applies a compressive force to the ferrule.

Embodiment 27. A method for forming a fluidic connection between a chromatography column and a GC component, the method comprising: attaching a chromatography column adaptor according to any of embodiments 1 to 14, to a GC component so as to form a seal between the external conical sealing surface of the column adaptor and an internal conical sealing surface of the GC component; passing an end of the chromatography column through a ferrule and a nut; inserting the column into the wide adaptor bore of the adaptor; inserting a ferrule into the internal conical sealing surface; and attaching the column to the adaptor by applying a force to the ferrule to form a seal between the ferrule and the chromatography column adaptor and the chromatography column.

Embodiment 28. The method of embodiment 27, wherein the adaptor comprises threads on an outside adaptor wall, and the nut comprises threads reciprocal to the threads on the adaptor, and the column is attached to the adaptor by mating the threads of the nut with the threads of the adaptor and tightening the nut on the adaptor.

Embodiment 29. The method of embodiment 27 or embodiment 28, wherein the adaptor body comprises an engagement feature, and the method comprises using the engagement features to turn the adaptor relative to the GC component to form a seal.

Embodiment 30. The method of any of embodiments 27 to 29, comprising preventing rotation of the adaptor while tightening the nut on the adaptor to avoid further tightening the connection between the adaptor and GC component.

The foregoing descriptions of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A chromatography column adaptor configured for fluidically coupling a column to a GC component, the adaptor comprising:
   a GC component interfacing end and a column receiving end;
   an adaptor body comprising a wider adaptor bore at the column receiving end, a narrower adaptor bore at the GC component interfacing end;
   an external conical sealing surface at the GC component interfacing end; and
   an internal conical sealing surface at the column receiving end of the wider adaptor bore;
   wherein the narrower adaptor bore forms at least a portion of a flow path through the adaptor body to the GC component.

2. The chromatography column adaptor of claim 1, wherein the adaptor does not comprise a separate tube within the narrower adaptor bore.

3. The chromatography column adaptor of claim 1, wherein the column receiving end is configured to receive the column having an outer diameter from 1/16 inch to 3/8 inch.

4. The chromatography column adaptor of claim 1, wherein the adaptor body comprises a tapering adaptor bore connecting the wider and narrower adaptor bores.

5. The adaptor of claim 1, wherein the adaptor body further comprises an intermediary adaptor bore between the narrower adaptor bore and the wider adaptor bore.

6. The chromatography column adaptor of claim 1, wherein the adaptor body comprises an outside adaptor wall and an inside adaptor wall, wherein the inside adaptor wall defines the wider adaptor bore and the narrower adaptor bore.

7. The chromatography column adaptor of claim 6, wherein the outside adaptor wall has threads at the GC component interfacing end configured for engaging with threads on the GC component to apply a compressive force to the external conical sealing surface.

8. The chromatography column adaptor of claim 6, wherein the outside adaptor wall has threads at the column receiving end.

9. The chromatography column adaptor of claim 6, further comprising a coating on the inside adaptor wall, wherein the coating is adapted for reducing interactions with analytes.

10. The chromatography column adaptor of claim 1, further comprising a coating on the external conical sealing surface, wherein the coating is adapted for facilitating creation of a seal.

11. The chromatography column adaptor of claim 1, wherein the external conical sealing surface has a protrusion end surrounding the narrower adaptor bore and a protrusion sidewall extending between the protrusion end and a remainder of the adaptor body.

12. The chromatography column adaptor of claim 11, wherein the protrusion sidewall is at a 40 to 60 degree angle with respect to the protrusion end.

13. The chromatography column adaptor of claim 1, wherein the adaptor body further comprises an engagement feature.

14. The chromatography column adaptor of claim 1, wherein the adaptor is formed from stainless steel or brass.

15. A chromatography column adaptor assembly comprising:
   a chromatography column having a chromatography column end; and
   the chromatography column adaptor according to claim 1;
   wherein the GC component comprises a GC component flow path; and
   wherein the chromatography column end is disposed in the wider adaptor bore, and the GC component interfacing end of the chromatography column adaptor is fluidically connected with the GC component flow path.

16. The chromatography column assembly of claim 15, wherein the chromatography column is a packed column.

17. The chromatography column assembly of claim 15, wherein the fluidic connection is made without a separate tube within the narrower adaptor bore.

18. The chromatography column assembly of claim 15, wherein the GC component comprises a GC inlet, a GC detector, or a chromatography fluidic device configured for backflushing, switching, or splitting fluid flow.

19. The chromatography column assembly of claim 15, wherein the GC component flow path and the narrower adaptor bore have substantially the same cross-sectional area.

20. A method for forming a fluidic connection between a chromatography column and a GC component, the method comprising:
   attaching a chromatography column adaptor according to claim 1 to a GC component so as to form a seal between the external conical sealing surface of the column adaptor and an internal conical sealing surface of the GC component;
   passing an end of the chromatography column through a ferrule and a nut;
   inserting the column into the wider adaptor bore of the adaptor;
   inserting a ferrule into the internal conical sealing surface; and
   attaching the column to the adaptor by applying a force to the ferrule to form a seal between the ferrule and the chromatography column adaptor and the chromatography column.

* * * * *